United States Patent [19]

Ty

[11] 4,217,398
[45] Aug. 12, 1980

[54] THERMOSTAT METAL

[75] Inventor: Henry Ty, Attleboro, Mass.

[73] Assignee: Texas Instruments Incorporated, Dallas, Tex.

[21] Appl. No.: 949,483

[22] Filed: Oct. 10, 1978

[51] Int. Cl.² .................... B32B 15/04; B32B 15/18
[52] U.S. Cl. ................................ 428/616; 428/655; 428/685
[58] Field of Search ............... 428/616, 617, 618, 655, 428/685, 656

[56] References Cited

U.S. PATENT DOCUMENTS

| | | | |
|---|---|---|---|
| 1,991,438 | 2/1935 | Wohrman | 428/616 |
| 2,349,577 | 5/1944 | Dean | 428/616 |
| 2,461,518 | 2/1949 | Chace | 428/616 |
| 2,470,753 | 5/1949 | Albon | 428/616 |
| 3,030,699 | 4/1962 | Alban | 428/616 |
| 3,219,423 | 11/1965 | Sears et al. | 428/618 |
| 3,782,908 | 1/1974 | White | 428/616 |

OTHER PUBLICATIONS

1978 *Databook*, Metal Progress MID-June 1978, p. 70.

*Primary Examiner*—L. Dewayne Rutledge
*Assistant Examiner*—Michael L. Lewis
*Attorney, Agent, or Firm*—John A. Haug; James P. McAndrews

[57] ABSTRACT

A thermostat metal characterized by low cost has a substantially linear temperature response over a wide temperature range from 0° to 800° F. and is adapted for wide use for temperature control purposes in a whole variety of electrical cooking appliances, particularly when used in combination with integral but thermally-inactive support means for the thermostat metal. The thermostat metal comprises a layer of metal of relatively high coefficient of thermal expansion having a nominal composition by weight of 72 percent manganese, 18 percent copper and 10 percent nickel metallurgically bonded to a layer of metal of relatively lower coefficient of thermal expansion comprising 430 Stainless Steel, whereby the bimetal material displays a sufficiently high and linear flexivity over a wide temperature range to be useful in the various different types of thermostats used in cooking appliances.

3 Claims, 5 Drawing Figures

THERMOSTAT METAL

A wide variety of small electrical cooking appliances are being offered for sale using many different types of thermostatic controls and those controls incorporate many different types of thermostat metals. For example, precalibrated, stack-type thermostats are typically used in hamburger cooker appliances and in minifryers; manually-adjustable, stack-type thermostats are usually employed to meet the requirements of bake ovens and multipurpose cookers; and ambient compensated timing thermostats are used to meet the different requirements of toasters and toaster ovens. The thermostat metals used in such cooking appliance controls usually embody layers of metal of relatively high and low coefficients of thermal expansion which are bonded together to achieve whatever thermal response characteristics are desired for the particular cooking appliance application.

Typically for example where the thermostat metal is to be used in precalibrated, stack-type thermostat for a small hamburger cooker or the like, the thermostat metal embodies a layer of metal having a nominal composiiton of 22 percent nickel, 3 percent chromium and the balance iron metallurgically bonded to a layer of metal comprising 42 percent nickel and the balance iron, whereby the bimetal material displays its maximum flexivity of about $130 \times 10^{-7}$ in the temperature range from 200° to 600° F. (Alloy percentages as referenced herein are stated by weight unless otherwise specified and thermostat metal flexivity is stated in inches per inch per degree Fahrenheit.) Alternately, a thermostat metal used in a similar small cooking appliance control frequently comprises a layer of metal having a nominal composition of 19.5 percent nickel, 2.25 percent chromium, 0.5 percent carbon and the balance iron bonded to a layer of metal comprising 42 percent nickel and the balance iron. Such an alternate bimetal material displays its maximum flexivity of about $135 \times 10^{-7}$ in the same 200° to 600° F. temperature range. In other thermostat metals used in other cooking appliance controls, a layer of metal having a nominal composition of 22 percent nickel, 3 percent chromium, and the balance iron is bonded to a layer of metal comprising 36 percent nickel and the balance iron to provide a maximum flexivity of about $132 \times 10^{-7}$ in the temperature range from 0° to 300° F., or is bonded to a layer of metal comprising 40 percent nickel and the balance iron to provide a maximum flexivity of about $132 \times 10^{-7}$ in the temperature range from 100° to 550° F. In still other thermostat metals used in cooking appliance controls, a layer of metal having a nominal composition of 25 percent nickel, 8.5 percent chromium and the blance iron is bonded to a layer of metal embodying 42 percent nickel and the balance iron to provide a maximum flexivity of $118 \times 10^{-7}$ in the temperature range from 200° to 600° F., or embodying 45 percent nickel and the balance iron to provide maximum flexivity in the temperature range from 250° to 700° F., or embodying 50 percent nickel and the balance iron to provide a maximum flexivity of about $79 \times 10^{-7}$ in the higher temperature range from about 300° to 800° F.

The thermostat metals used in such small electrical cooking appliance controls are found to be quite expensive and in many cases it is found that the cost of the thermostat used in such an appliance constitutes a disproportionately large part of the total cost of the cooking appliance. The high cost of such thermostat metals is in large part attributable to the fact that the thermostat metals are manufactured only in small quantities using metal alloys which are also made in relatively small volume. That is, where different bimetals are used to provide different temperature response characteristics for different cooking appliances, at least one of the alloys used in each of the bimetals is likely to be a small volume, specialty metal. Further the bimetal combinations are usually bonded in small quantities to meet the specifications of individual customers.

It would be desirable if a thermostat metal made with relatively low cost materials could be provided with thermal response characteristics such that a single type of bimetal could be used to meet the requirements of thermostats throughout the full range of temperatures used in cooking appliances of various kinds, whereby the thermostat metal could be manufactured in large volume at low unit cost for use in such appliances. It would also be desirable if such a novel thermostat metal could be used interchangeably with the thermostat metals which are presently used in the cooking appliances now being sold without requiring any major redesign of the appliance configurations, whereby the novel bimetal could be promptly made in large volume to achieve the economies of volume manufacture.

It is an object of this invention to provide a novel and improved composite metal; to provide such a thermostat metal which is adapted for use for temperature control purposes in electrical cooking appliances; to provide such a thermostat metal which is characterized by relatively low material and manufacturing cost; to provide such a thermostat metal which displays a substantially linear temperature response over the wide temperature range from 0° F. to 800° F. so that the thermostat metal is adapted for use in the wide variety of electrical cooking appliances presently being offered for sale; to provide such a thermostat metal which displays suitably high flexivity over that wide temperature range so that the thermostat metal is adapted to be substituted directly or otherwise for the thermostat metals presently being used in cooker appliance controls without requiring any major redesign of the cooker appliance configurations; and to provide such a thermostat metal which otherwise displays characteristics making it suitable for widespread application in cooker appliances of various kinds.

Other objects, advantages and details of the novel and improved thermostat metal of this invention appear in the following detailed description of preferred embodiments of the invention, the detailed description referring to the drawings in which.

Figure 1:
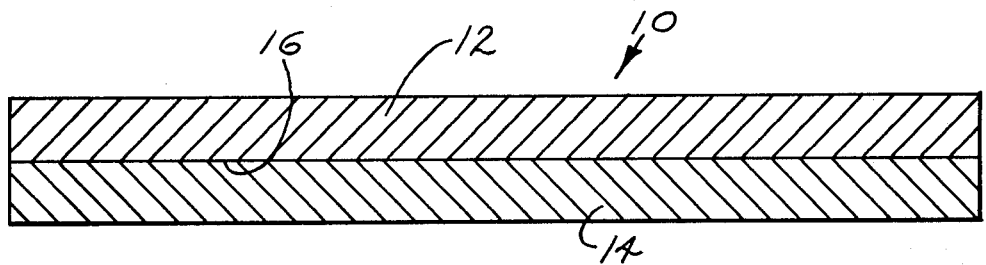
FIG. 1 is a section view along the length of a strip of the thermostat metal provided by this invention.

Referring to the drawings, 10 in FIG. 1 indicates the novel and advantageous thermostat metal of this invention which is shown to include a first layer of metal 12 of relatively high coefficient of thermal expansion metallurgically bonded to a second layer of metal 14 of relatively lower coefficient of thermal expansion along the interface 16 between the metal layers. As will be understood, the composite bimetallic thermostat metal 10 is adapted to flex to a predetermined degree when subjected to selected temperature change for performing a thermally responsive control function in a thermostat (not shown) in a conventional manner.

In accordance with this invention, the first layer 12 of the thermostat metal 10 is formed from a manganese-based alloy having a composition by weight of from 71 to 76 percent manganese, from 9.5 to 19 percent copper, from 9 to 15 percent nickel, 0.10 percent (max.) carbon, 0.10 percent (max.) silicon, 0.025 percent (max.) sulfur, and 1.00 percent (max.) iron. Preferably for example, the layer 12 is formed of an alloy hereinafter referenced as Alloy P having a composition of 71.00 to 73.00 percent manganese, 9.00 to 11.00 percent nickel, 17.00 to 19.00 percent copper, 0.10 percent (max.) carbon, 0.10 percent (max.) silicon, 0.025 percent (max.) sulfur, and 1.00 percent (max.) iron, said alloy being commonly said to have a nominal composition of 72 percent manganese, 18 percent copper and 10 percent nickel. That alloy is characterized by a very high coefficient of thermal expansion or expansivity of about $14.7 \times 10^{-6}$ inches per inch per degree F. in the temperature range from 78° F. to 200° F. and by a modulus of elasticity of about 18,000,000 psi. As the material used in layer 12 is well known and has been widely used in many different types of thermostat metals, the alloy is not further described herein and it will be understood that the alloy is further characterized by a generally linear change in thermal response coefficient over the longer temperature range from 0° to 800° F. as illustrated by curve a in FIG. 4. Alternately the layer 12 is formed of an alloy hereinafter referenced as Alloy PA having a composition by weight of 74.00 to 75.00 percent manganese, 15.00 to 16.00 percent nickel, 9.50 to 10.00 percent copper, 0.10 percent (max.) carbon, 0.10 percent (max.) silicon, and 1.00 percent (max.) iron, said alloy being commonly said to have a nominal composition of 75 percent manganese, 15 percent nickel, and 10 percent copper. As this material is also well known and widely used in thermostat metals, this alloy is not further described herein and it will be understood that the alloy is characterized by a modulus of elasticity of 18,000,000 psi., by a coefficient of thermal expansion of about 15.5 inches per inch per degree F. in the temperature range from 78° F. to 200° F., by a coefficient of thermal expansion of about 17.5 inches per inch per degree F. over the temperature range from 78° F. to 700° F., and by a generally linear change in coefficient of thermal expansion over the temperature range from 0° to 800° F.

In accordance with this invention, the second layer 14 of the thermostat metal 10 is formed from one of the (stainless steels commonly known as) 400 Series Stainless Steels which have compositions by weight and physical characteristics as set forth in Table I. Such stainless steels are designated as 51 403 Stainless Steels etc. by the American Society of Automotive Engineers and as 403 Stainless Steels etc. by the American Iron and Steel Institute. Preferably for example, the layer 14 is formed of 430 Stainless Steel which is characterized by a much lower coefficient of thermal expansion than the material of the layer 12. That 403 Stainless Steel has a coefficient of thermal expansion of about $5.6 \times 10^{-6}$ inches per inch per degree F. in the temperature range from about 78° to 200° F. and by a modulus of elasticity of about 29,000,000 psi. As that material is well known, is widely used for many different purposes, and is readily available from many sources at relatively low cost, the material is not further described herein and it will be understood that the material is characterized by a substantially linear change in coefficient of thermal expansion over the temperature range from 0° to 800° F. as is illustrated by curve b in FIG. 4. Alternately any one of the other 400 Series Stainless Steels such as those shown in Table 1, which have similar linear thermal response characteristics over the temperature range from 0° to 800° F., is used in layer 14 of the thermostat metal of this invention.

Table I

| Desig. No. | Carbon (max.) | Manganese (max.) | Silicon (max.) | Phosphorous (max.) | Sulfur (max.) | Chromium | Nickel | Other | Iron | Modulus of Elasticity | Coefficient of Thermal Expansion 78° F. to 700° F. |
|---|---|---|---|---|---|---|---|---|---|---|---|
| 403 | .15 | 1.00 | .50 | — | .03 | 11.50 to 13.00 | — | — | Bal. | $29 \times 10^7$ | $5.6 \times 10^{-6}$ |
| 410 | .15 | 1.00 | 1.00 | — | .03 | 11.50 to 13.00 | — | — | Bal. | $29 \times 10^7$ | $5.6 \times 10^{-6}$ |
| 414 | .15 | 1.00 | 1.00 | — | .03 | 11.50 to 13.00 | 1.25 to 2.50 | — | Bal. | $29 \times 10^7$ | $5.6 \times 10^{-6}$ |
| 416 | .15 | 1.25 | 1.00 | .06 | — | 12.00 to 14.00 | — | .15 min. sulfur | Bal. | $29 \times 10^7$ | $5.6 \times 10^{-6}$ |
| 420 | — | 1.00 | 1.00 | — | .03 | 12.00 to 14.00 | — | .15 min. carbon | Bal. | $29 \times 10^7$ | $5.6 \times 10^{-6}$ |
| 431 | .20 | 1.00 | 1.00 | — | .03 | 15.00 to 17.00 | 1.25 to 2.50 | — | Bal. | $29 \times 10^7$ | $5.6 \times 10^{-6}$ |
| 405 | .08 | 1.00 | 1.00 | — | .03 | 11.50 to 14.00 | — | .1 to .3 aluminum | Bal. | $29 \times 10^7$ | $5.6 \times 10^{-6}$ |
| 431 | .12 | 1.00 | 1.00 | — | .03 | 14.00 to 18.00 | — | — | Bal. | $29 \times 10^7$ | $5.6 \times 10^{-6}$ |
| 430F | .12 | 1.25 | 1.00 | .06 | — | 14.00 to | — | .15 min. | Bal. | $29 \times 10^7$ | $5.6 \times 10^{-6}$ |

Table I-continued

| Desig. No. | Carbon (max.) | Manganese (max.) | Silicon (max.) | Phosphorous (max.) | Sulfur (max.) | Chromium | Nickel | Other | Iron | Modulus of Elasticity | Coefficient of Thermal Expansion 78° F. to 700° F. |
|---|---|---|---|---|---|---|---|---|---|---|---|
| | | | | | | 18.00 | | sulfur | | | |

Figure 4:
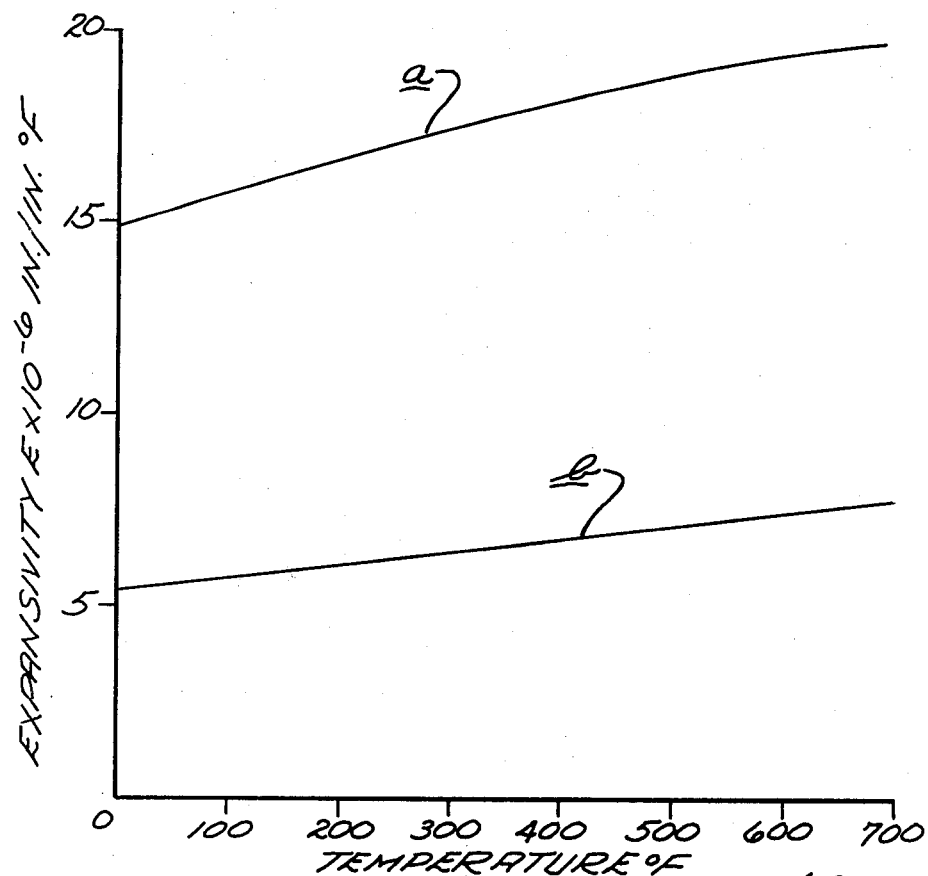
FIG. 4 is a graph illustrating the thermal response characteristics of the metal materials used in the thermostat metal of FIG. 1.
Figure 5:
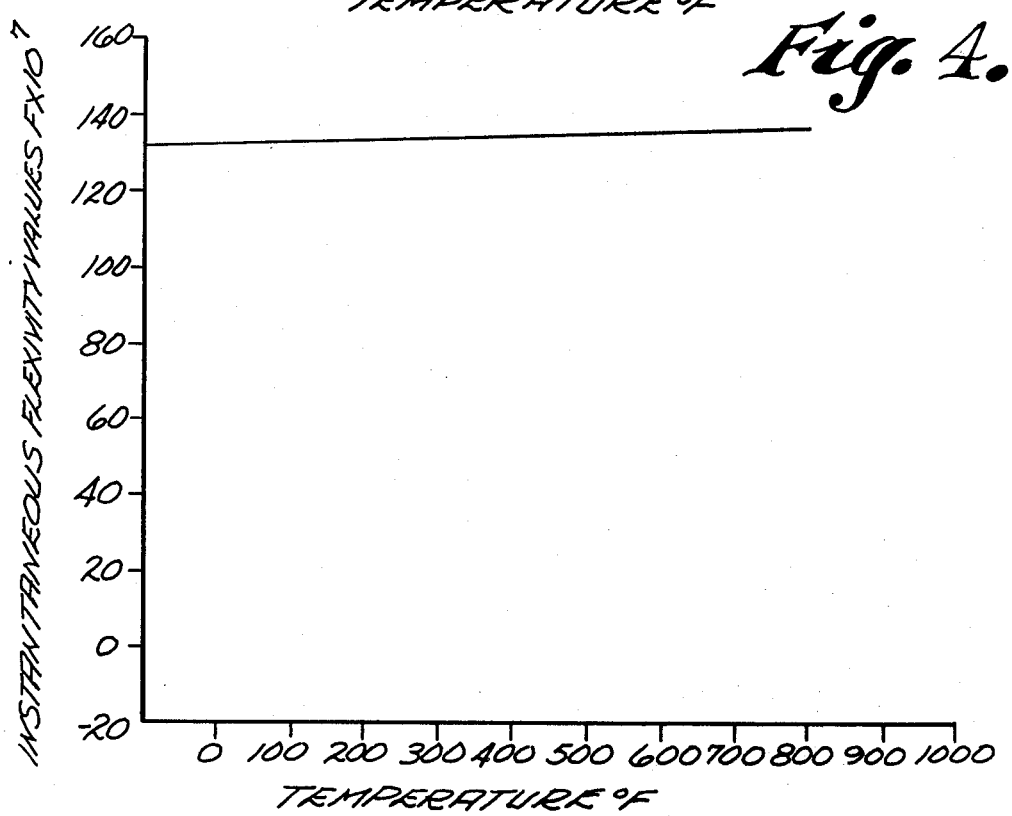
FIG. 5 is a graph illustrating the thermal response characteristics of the thermostat metal of FIG. 1.

In accordance with this invention, the metal layers 12 and 14 are metallurgically bonded together by conventional roll bonding or by the use of other procedures conventionally used in forming thermostat metals, whereby the metal layers are securely bonded together substantially throughout the interface 16 between the layers and whereby the metal layers are provided with selected relative thickness and with a selected degree of hardening such that the novel thermostat metal 10 displays a high flexivity while also displaying that flexivity substantially linearly throughout the entire temperature range from 0° to 800° F. That is, the metal layers 12 and 14 having the individual thermal response characteristics shown in FIG. 4 are combined to provide a thermostat metal having flexivity characteristics which are substantially linear throughout the temperature range required for use in small electrical cooking applicances. Typically, the thermostat metal 10 has a total composite thickness in the range from about 0.015 inches to 0.090 inches and the layers 12 and 14 have relative thicknesses each varying in the range from 45 to 55 percent of the total thickness of the bimetal material. Preferably for example the thermostat metal 10 embodies equal thicknesses of the metal layer materials illustrated in curves a and b in FIG. 4 so that the bimetallic material displays a high and substantially linear flexivity of about $130 \times 10^{-7}$ inches per inch per degree F. over the entire temperature range from 0° to 800° F. as illustrated by curve c in FIG. 5.

Other exemplary thermostat metals provided by this invention and described in detail in Table II display substantially linear flexivity in the temperature range from 0° to 800° F. as indicated in Table II as follows:

same thermostat metal 10 which displays a desired thermal response in a precalibrated, stack-type thermostat in a selected temperature range to serve the needs of one small electrical cooker appliance such as a hamburger cooker is also adapted to display the desired thermal response in a manually-adjustable, stack type thermostat or in an ambient-compensated timing thermostat to serve the needs of other cooker appliance applications. The thermostat metal 10 has sufficient flexivity to be used in substitution for expensive, high flexivity bimetals previously used in some cooker appliances and also has the necessary high temperature response characteristics to be used in substitution for the even more expensive high temperature bimetals previously used in some other cooker appliances.

The substitution of the thermostat metals 10 for those previously used in various different cooker appliances can also be quite direct so that little or no redesign of the cooker appliances presently in the market would be required for using the novel, low cost thermostat metals 10 in such appliances. That is, the novel thermostat metals 10 can be directly substituted for some of the high flexivity thermostat metals previously used in some cooker appliances. Further, because the thermostat metals 10 have such high flexivity, they can be combined with various conventional support means to reduce the effective flexivity of the materials to relatively lower levels, whereby the bimetals provided by this invention can also be substituted for the thermostat metals presently used in other cooker appliances where only lower flexivities are required by the particular cooker appliance configurations.

Figure 2:
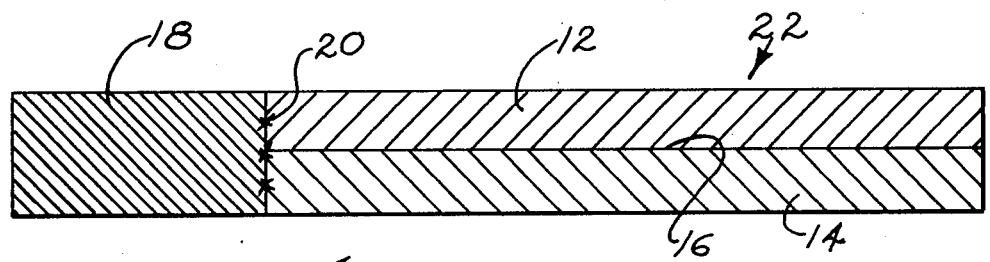
FIG. 2 is a section view similar to FIG. 1 illustrating the thermostat metal of FIG. 1 combined with a thermally inactive support means.

That is, as is illustrated in FIG. 2, a thermally inactive

Table II

| Example No. | Layer 12 Material (Alloy Design) | Thickness (In.) | Layer 14 Material (Desig No.) | Thickness (In.) | Flexivity (In./In./°F.) 0 to 200° F. | Flexivity (In./In./°F.) 0 to 800° F. |
|---|---|---|---|---|---|---|
| 2 | P | .020 | 416 | .020 | $128 \times 10^{-7}$ | $130 \times 10^{-7}$ |
| 3 | P | .025 | 416 | .020 | $124 \times 10^{-7}$ | $126 \times 10^{-7}$ |
| 4 | P | .020 | 410 | .020 | $128 \times 10^{-7}$ | $130 \times 10^{-7}$ |
| 5 | P | .025 | 430TI | .020 | $124 \times 10^{-7}$ | $126 \times 10^{-7}$ |
| 6 | PA | .020 | 410 | .025 | $134 \times 10^{-7}$ | $136 \times 10^{-7}$ |
| 7 | PA | .020 | 430 | .020 | $138 \times 10^{-7}$ | $140 \times 10^{-7}$ |
| 8 | PA | .020 | 430 | .025 | $134 \times 10^{-7}$ | $136 \times 10^{-7}$ |
| 9 | PA | .020 | 430TI | .025 | $134 \times 10^{-7}$ | $136 \times 10^{-7}$ |
| 10 | PA | .025 | 405 | .020 | $134 \times 10^{-7}$ | $136 \times 10^{-7}$ |

It can be seen that the thermostat metal 10 of this invention incorporates relatively low cost materials which are adapted to be metallurgically bonded together using economical, conventional procedures but that the thermostat metal displays a high flexivity of about $130 \times 10^{-7}$ in./in./°F. or more and is adapted to display that high flexivity linearly over the wide temperature range from 0° to 800° F. used in small cooking appliance thermostats. The thermostat metal 10 is thus adapted for use in the wide variety of electrical cooking appliances being offered for sale in the market place and is adapted to be manufactured in large volume at relatively low unit cost to serve that market. That is, the support portion 18 of low carbon steel or the like is welded to a strip of the bimetal 10 along a lateral edge of the bimetal as indicated at 20 in FIG. 2, thereby to form a thermostat member 22. As such welding of an integral but thermally inactive support means 18 to a thermostat metal is well known, it is not further described herein. However, it will be understood that where part of the length of the member 22 is made up of the thermally inactive support 18 which can be employed for mounting the member in a thermostat structure, the member 22 flexes relatively less in response to selected temperature change than would be the case if the entire length of the member were made up of the bimetal material 10. Accordingly, the member 22 is adapted to be substituted in a cooker appliance thermostat for a member of corresponding size made up entirely of a bimetal displaying relatively less flexivity per unit length than the bimetal 10.

Figure 3:
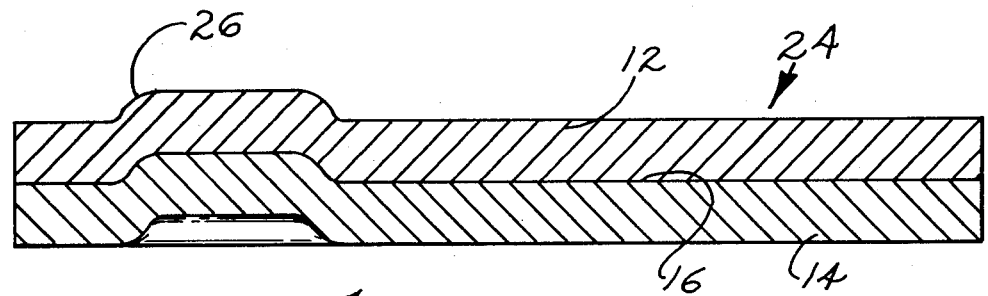
FIG. 3 is section view similar to FIG. 1 illustrating the thermostat metal of FIG. 1 provided with a stiffening rib for rendering a support portion of the thermostat metal thermally inactive.

Similarly, the thermostat metal 10 is also adapted to be substitued for other thermostat metals having lower flexivity where a portion of the metal is rendered thermally inactive as illustrated in FIG. 3. That is, where the thermostat metal 10 as described above provides relatively more flexivity than the thermostat metal presently being used in a portion of the temperature range from 0° F. to 800° F. in a particular cooking appliance thermostat, a correspondingly sized member 24 is formed as shown in FIG. 3 to include a stiffening rib-shaped embossment 26 which renders the ribbed portion of the member thermally inactive and thereby reduces the effective flexivity per unit length of the member to match the flexivity per unit length of the thermostat metal previously used in the thermostat structure.

It can be seen from the above that the novel and improved thermostat metal 10 of this invention displays substantially linear flexivity throughout the temperature range from 0° F. to 800° F. That is, as is shown in the graph of FIG. 4, the flexivity of the thermostat metal is greater than $130 \times 10^{-7}$ inches per inch per degree F. in any selected part of that temperature range and does not exceed $135 \times 10^{-7}$ in any part of the range. Accordingly, where substantially all cooking appliance thermostats are adapted to operate in that temperature range, where such cooking appliance thermostats operate with maximum flexivities of about $135 \times 10^{-7}$ inches per inch per degree F. in some part of that temperature range, and where the effective flexivity per unit length of a thermostat member made from the thermostat metals 10 is adapted to be reduced as required by using thermally inactive means as shown in FIGS. 2 and 3, the thermostat metals of this invention are adapted to meet the thermal response characteristics of substantially all cooking appliance applications as described above. The thermostat metals 10 also display a modulus of elasticity of about 24,000,000 and have other properties required for use in cooking appliance thermostats. The thermostat metals 10 thus represent a significant advance in the thermostat metal art to serve the needs of cooking appliance applications at substantially lower cost.

It should be understood that although particular embodiments of the thermostat metals of this invention have been described in detail by way of illustrating this invention the invention includes all modifications and equivalents of the disclosed embodiments falling within the scope of the appended claims.

I claim:

1. A two-layer thermostat metal having two layers of metal of such selected relative thickness that the thermostat metal is adapted to display a substantially linear flexivity greater than about $130 \times 10^{-7}$ inches per inch per degree Fahrenheit in all parts of the temperature range from 0° F. to about 800° F., said thermostat metal consisting only of a first layer of metal of relatively high coefficient of thermal expansion having a nominal composition by weight of from 71 to 76 percent manganese, from 9 to 19 percent copper, and from 9 to 17 percent nickel metallurgically bonded to a second layer of metal or relatively lower coefficient of thermal expansion selected from the group consisting of the stainless steel alloys having compositions by weight as set forth in Table I.

2. A thermostat metal as set forth in claim 1 wherein said first layer of metal has a selected thickness and a nominal composition by weight of 72 percent manganese, 18 percent copper and 10 percent nickel and said second layer of metal has substantially the same selected thickness and a nominal composition by weight of 0.12 (max.) percent carbon, 1.00 (max.) percent manganese, 1.00 (max.) percent silicon, 0.03 (max.) percent sulfur, 14.00 to 18.00 percent chromium and the balance iron.

3. A thermostat member adapted to display an effective, substantially linear flexivity of less than about $130 \times 10^{-7}$ inches per inch per degree Fahrenheit in all parts of the temperature ranges from 0° F. to about 800° F. comprising a first two-layer, bimetallic thermally active portion having only a first layer of metal of relatively high coefficient of thermal expansion having a nominal composition by weight of from 71 to 76 percent manganese, from 9 to 19 percent copper, and from 9 to 17 percent nickel metallurgically bonded to a second layer of metal of relatively lower coefficient of thermal expansion selected from the group consisting of the stainless steel alloys having compositions by weight as set forth in Table I, said first and second layers having selected relative thicknesses providing said thermally active portion with a substantially linear flexivity greater than about $130 \times 10^{-7}$ inches per inch per degree Fahrenheit in all parts of the temperature range from 0° to about 800° F., and a second thermally inactive portion integral with said first portion of the member.

* * * * *